United States Patent [19]

Huck et al.

[11] Patent Number: 5,107,710
[45] Date of Patent: Apr. 28, 1992

[54] PRESSURE SENSOR

[75] Inventors: Ralf Huck, Hanau; Wolfgang Müller, Langenselbold, both of Fed. Rep. of Germany

[73] Assignee: Degussa, Fed. Rep. of Germany

[21] Appl. No.: 605,854

[22] Filed: Oct. 31, 1990

[30] Foreign Application Priority Data

Jan. 8, 1990 [DE] Fed. Rep. of Germany ....... 4000326

[51] Int. Cl.$^5$ .......................... G01L 9/06; G01L 19/04
[52] U.S. Cl. .......................... 73/708; 73/721; 73/727; 338/4
[58] Field of Search ................ 73/708, 721, 727, 720, 73/726, 862.63; 338/4, 3

[56] References Cited

U.S. PATENT DOCUMENTS

| | | | |
|---|---|---|---|
| 3,341,794 | 9/1967 | Stedman | 338/4 |
| 4,333,349 | 6/1982 | Mallon et al. | 338/4 |
| 4,530,244 | 7/1985 | Starr | 73/727 |
| 4,622,856 | 11/1986 | Binder et al. | 338/4 |
| 4,798,093 | 1/1989 | Kenoun | 73/708 |

Primary Examiner—Donald O. Woodiel
Attorney, Agent, or Firm—Cushman, Darby & Cushman

[57] ABSTRACT

A pressure sensor (38) is proposed with strain gauges (18, 20, 22, 24) such as thick-film resistance strain gauges arranged on a diaphragm, these gauges being preferably connected to form a Wheatstone bridge, where branches of the bridge circuit have compensating resistors (26, 28, 30, 32). The compensating resistors are arranged outside the active area (17) of the diaphragm.

6 Claims, 4 Drawing Sheets

PRESSURE SENSOR

The invention relates to a pressure sensor with strain gauges such as thick-film resistance strain gauges arranged on a diaphragm and preferably connected to form a Wheatstone bridge, where branches of the bridge circuit have compensating resistors for balancing the bridge with regard to temperature response and/or zero signal, said compensating resistors being arranged on the pressure sensor.

A pressure sensor with thick-film resistance strain gauge is given in DE-OS 29 40 441. The thick-film resistance strain gauges are deposited using the screen printing process onto the active area of a diaphragm held tightly at the edge. This active area is inside the fastening means on the front or rear of the diaphragm, so that deformations of the diaphragm occurring as a result of pressure or stress acting thereon are manifested in a change in the resistances, thereby permitting conclusions to be drawn about the mechanical effects on the diaphragm.

The resistance gauges are connected together to form a Wheatstone bridge, with said Wheatstone bridge not being balanceable with regard to temperature response and zero signal.

The integration of compensating resistors at particular points in suitable bridge circuits is known. Compensating resistors are arranged on that surface of a rigid plate facing away from the diaphragm, said plate forming the baseplate of the pressure sensor itself. To connect the compensating resistors into the bridge circuit, it is necessary to make a low-resistance connection between the diaphragm and that side of the rigid plate facing away from the diaphragm, which is obviously very expensive particularly with very thick baseplates. There is the additional drawback that some contact materials cannot be subjected to thermal loads. For obvious reasons, contact cannot be made until the diaphragm and the rigid plate have been mechanically connected. Since the mechanical connection is however achieved in the form of a glass frit, all higher-melting contact materials are eliminated.

The purpose of the present invention is to develop a pressure sensor of the type mentioned at the outset such that compensating resistors can be connected in without difficulty and without the need to drill holes in the rigid plate or similar. At the same time, it must be ensured that the pressure or stress acting in the pressure sensor does not change the resistance values of the compensating resistors themselves.

The object is achieved in accordance with the invention by arranging the compensating resistors on the diaphragm outside its active area.

It is therefore not necessary in accordance with the invention for contact to be made by drilling holes in the carrier or base plate of the pressure sensor. Accordingly, problems with the selection of a suitable contact material are also ruled out. The circuit itself can now be deposited without difficulty, particularly when all thick-film resistance strain gauges are on one side of the diaphragm. In this case, the circuit can be deposited as a unit onto the free surface of the diaphragm, for example in screen printing process.

The invention is noteworthy in particular for the fact that the diaphragm is fastened to a holding means such as a ring preferably comprising glass frit, that the diaphragm projects over the periphery of the holding means, and that the compensating resistors are arranged on the peripheral edge of the diaphragm.

In an embodiment of the invention, the compensating resistors are arranged on the diaphragm above the holding means, preferably a ring comprising glass frit. According to a further embodiment of the invention, the compensating resistors and the bridge circuit are arranged on different sides of the same diaphragm. The contact then necessary of the front and rear of a thin diaphragm is relatively simple to make and is state of the art. All these measures too ensure that mechanical effects on the diaphragm do not result in an effect on the compensating resistors and thereby on their electrical values.

It has proved advantageous for the compensating resistors not to be spread evenly in the edge area of the diaphragm, i.e. in its inactive area. The resistors compensating the temperature response and the zero signal are preferably arranged in edge areas of the diaphragm that are diametrically opposite to one another.

Further details, advantages and features of the invention can be found not only in the claims and the features stated therein singly and/or in combination, but also in the following description of a preferred embodiment shown in the drawing.

Figure 1:
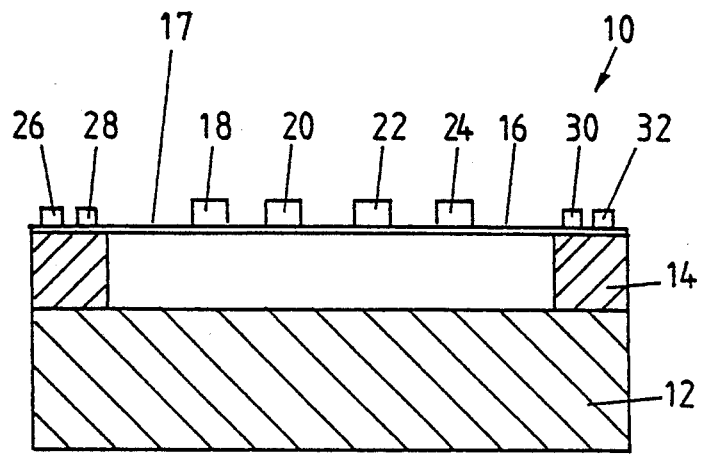
FIG. 1 shows a section through a first pressure sensor.

In the Figures, identical elements are identically numbered. Shown in purely diagrammatic form is a pressure sensor (10) made up of a rigid plate (12) as the base element, a holding ring (14) preferably comprising glass frit, and a diaphragm (16) arranged on said ring. On the diaphragm (16), resistors (18), (20), (22) and (24) are connected to form a Wheatstone bridge. These resistors are arranged on the active area (17) of the diaphragm (16), i.e. on the area which is mechanically deformed by the pressure effect.

The resistors (18), (20), (22) and (24) are thick-film strain gauges, as shown in DE-OS 29 40 441. The resistors (18), (20), (22) and (24) are deposited onto the diaphragm (16) in a screen printing process and can contain one or more of the following substances as their basic component: $RuO_2$, $IrO_2$, $TlO_2$, $Bi_2Ru_2O_7$, $Pb_2Ru_2O_7$, Au, Pt, Pd and their alloys.

If a force now acts on the diaphragm (16), said diaphragm (16) is now deformed in its active area (17). This deformation is transmitted to the thick-film strain gauges (18), (20), (22) and (24), so that their resistance values are altered. As a result, the Wheatstone bridge supplied via the connections $U_e$ is unbalanced, so that a signal is obtained at the outputs $U_a$ that permits conclusions to be drawn about the force acing on the diaphragm (16). The resistors identified with (18), (20), (22) and (24) and shown only in principle in FIG. 1 are identified as $R_1$, $R_2$, $R_3$ and $R_4$ in FIGS. 2 and 3. The resistors $R_1$, $R_2$, $R_3$ and $R_4$ are arranged in the usual way in order to pick up mechanical deformations of the diaphragm (16) to the required extent.

To achieve a balanced Wheatstone bridge with regard to temperature response and zero signal too, compensating resistors (26), (28), (30), (32) (FIG. 1) or $R_{T1}$, $R_{T2}$, $R_{N1}$ and $R_{N2}$ (FIG. 3) are provided. However, to prevent their resistance values from being changed by the mechanical deformation of the diaphragm (16), the resistors (26), (28), (30), (32) are arranged in the non-active areas of the diaphragm (16). These non-active areas can be seen to be above the fastening means (14), i.e. the ring preferably comprising glass and identified in FIG. 2 as (34). By the provision of the compensating resistors (26), (28), (30) and (32), it is consequently possible to deposit all the resistors of the Wheatstone bridge as a unit by the screen printing process, without the need to provide contacts through the fastening ring (14) and baseplate (12) or similar as is necessary according to the state of the art.

Figure 2:
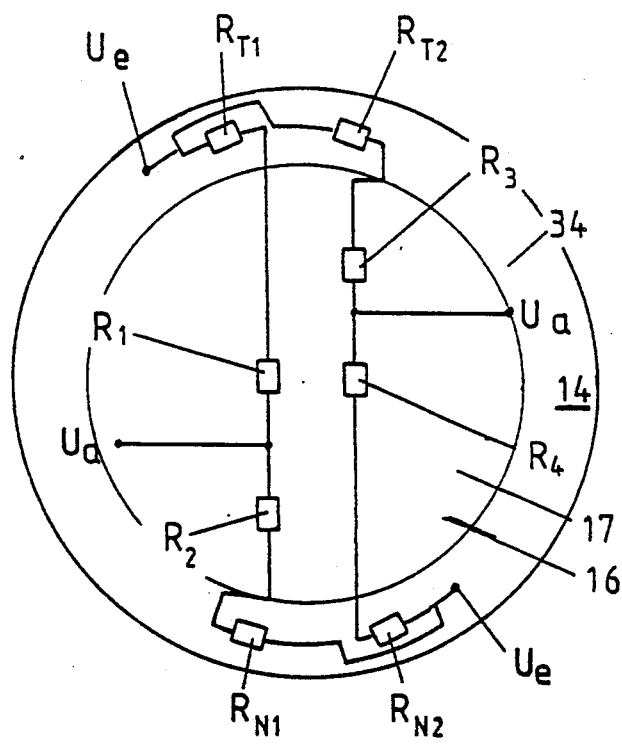
FIG. 2 shows the pressure sensor according to FIG. 1 in a plan view.

As FIG. 2 makes clear, the compensating resistors $R_{T1}$ and $R_{T2}$ affecting the temperature response are arranged diametrically opposite the compensating resistors $R_{N1}$ and $R_{N2}$ affecting the zero signal.

Different arrangements are of course possible, in particular an even distribution of the compensating resistors over the inactive part (34) of the diaphragm (16). However, the method shown in the Figures has proved particularly preferable.

Figure 3:
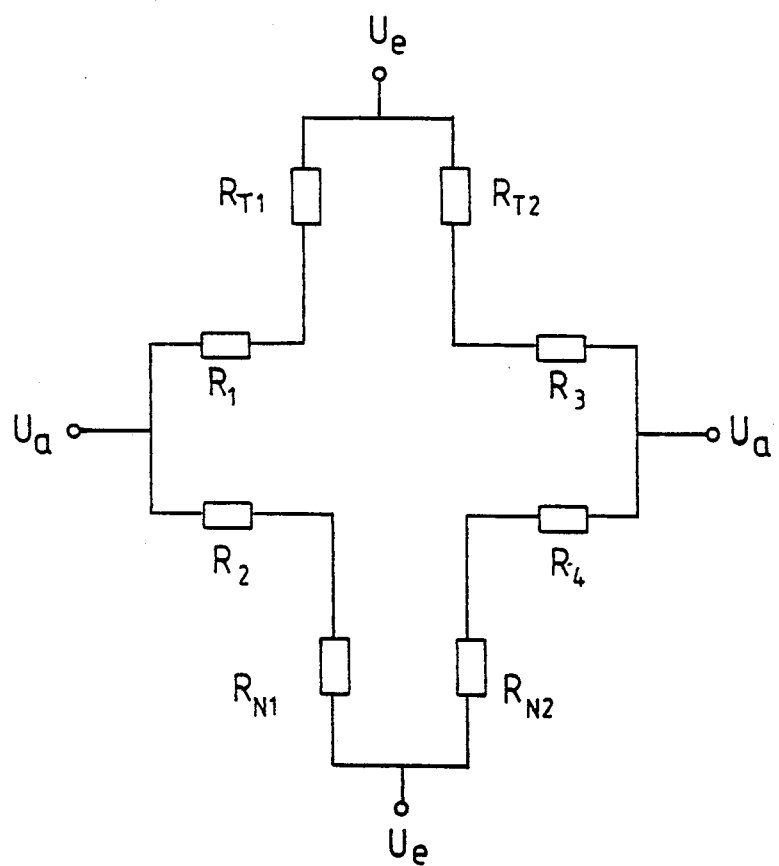
FIG. 3 shows an electrical wiring diagram.
Figure 4:
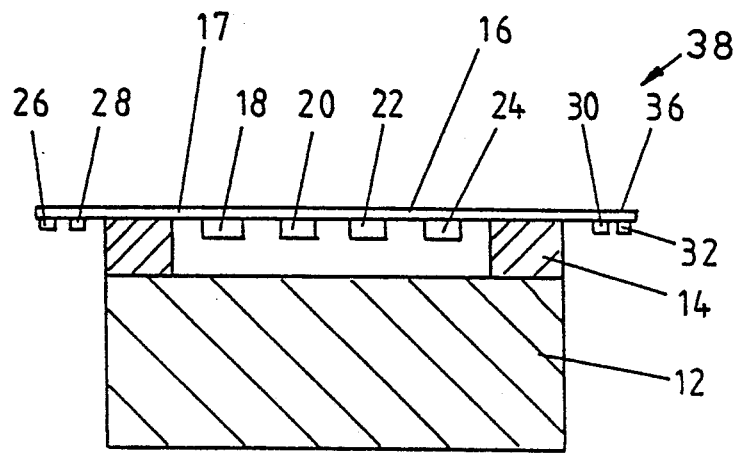
FIG. 4 shows a section through a further pressure sensor.
Figure 5:
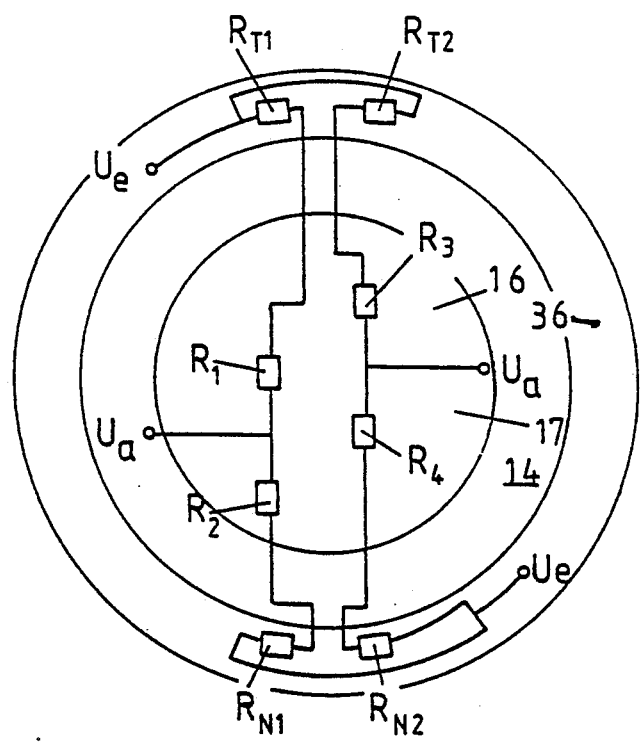
FIG. 5 shows the pressure sensor according to FIG. 4 in a plan view.

FIGS. 4 and 5 show a noteworthy embodiment of a pressure sensor in accordance with the invention that is identical in structure to that in FIGS. 1 and 2, and identical with regard to the connection of the resistors to FIG. 3. Here the diaphragm (16) is connected to the rigid plate (12) by a glass frit (14) of annular design. In the active area (17) of the diaphragm (16), i.e. inside the fastening or holding means (14), are arranged the resistors (18), (20), (22) and (24) connected up to form a Wheatstone bridge. The resistors (18), (20), (22) and (24) are here deposited on that surface of the diaphragm (16) facing the rigid plate (12)—preferably using the screen printing process such that said resistors are protected by the diaphragm (16) itself.

The diaphragm (16) has a surface which is greater than the surface limited by the holding means or glass frit ring (14). In other words, the diaphragm (16) projects out laterally beyond the holding means (14) with a preferably annular rim, such that the pressure sensor (38) in accordance with FIGS. 4 and 5 seen in section has a hat shape in which the brim is formed by the annular edge (36) of the diaphragm (16).

The compensating resistors (26), (28), (30) and (32) are arranged on this annular edge (36) on the side on which the resistors (18), (20), (22) and (24) are provided. The advantage of this is that the compensating resistors (26), (28), (30) and (32) can be deposited onto the diaphragm (16), for example using the screen printing process, simultaneously with the resistors (18), (20), (22) and (24) picking up the mechanical deformation. It is of course also possible to arrange all resistors on the free area of the diaphragm (16).

Figure 6:
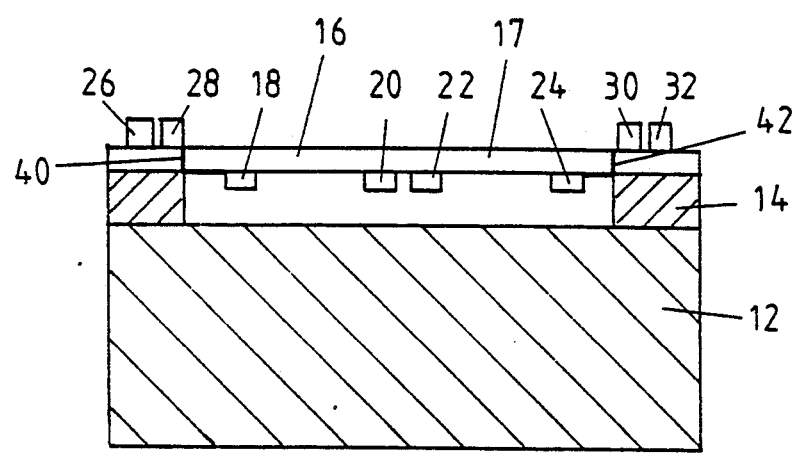
FIG. 6 shows a further variant of a pressure sensor.

FIG. 6 shows an alternative to the embodiment in FIG. 1. The compensating resistors (26), (28), (30) and (32) are arranged above the annular holding means (14), whereas the resistors (18), (20), (22) and (24) forming the Wheatstone bridge are arranged on the opposite side of the diaphragm (16), i.e. shielded. Although this design, that necessitates through-type contacts (40), (42), is more complicated to manufacture, this expense is justified by the obtaining of a less fragile pressure sensor. In all other respects, the pressure sensor in FIG. 6 has the same design as that in FIG. 1.

The wiring diagram of the pressure sensor with the compensating resistors and the resistors picking up the mechanical deformation of the diaphragm (16) is shown again in FIG. 3. By laser trimming of the resistors ($R_{T1}$), ($R_{T2}$), ($R_{N1}$) and ($R_{N2}$), the bridge can be balanced with regard to zero signal and temperature response. Each of these resistors can of course also be replaced by a series and/or parallel connection of resistors. This permits coverage of a greater trimming range.

Any other compensation circuit, for example as described in R. Kaufmann, "Messwertaufnehmer auf DMS-Basis und ihr Temperaturverhalten" in "Messen und Prufen", Dec. 1983, is also conceivable.

We claim:

1. A pressure sensing apparatus containing strain gauge resistors arranged on a diaphragm and connected to form a Wheatstone bridge having branches containing compensating resistors located outside the active region of said diaphragm for balancing the bridge with regard to temperature response and/or zero signal, the pressure sensing apparatus comprising:

a diaphragm, holding means for said diaphragm, said diaphragm being fastened to said holding means and projecting beyond the outer periphery of said holding means, the area of said diaphragm within said holding means being susceptible of mechanical deformation under pressure, said strain gauge resistors being attached to said diaphragm within said mechanically-deformable area of said diaphragm, said compensating resistors being arranged on an edge portion of said diaphragm which projects beyond the outer periphery of said holding means, and said resistors being thick film resistors.

2. The pressure sensing apparatus according to claim 1 wherein said holding means is a ring comprising a glass frit and the edge of said diaphragm projecting beyond said ring is annular.

3. The pressure sensing apparatus according to claim .1 wherein said Wheatstone bridge is provided with both temperature balancing resistors and zero signal compensating resistors, said temperature balancing resistors and said zero signal compensating resistors being arranged at diametrically opposite edge areas of said diaphragm.

4. A pressure sensing apparatus containing strain gauge resistors arranged on a diaphragm and connected to form a Wheatstone bridge having branches containing compensating resistors located outside the active region of said diaphragm for balancing the bridge with regard to temperature response and/or zero signal, the pressure sensing apparatus comprising:

a diaphragm, a rigid plate, a holding means fastened to said rigid plate, said diaphragm being fastened to said holding means at a location remote from said rigid plate and projecting beyond the outer periphery of said holding means, the area of said diaphragm within said holding means being susceptible of mechanical deformation under pressure, strain gauge resistors, said strain gauge resistors being attached to said diaphragm within said mechanically-deformable area of said diaphragm, compensating resistors, said compensating resistors being secured to an edge portion of said diaphragm projecting beyond the outer periphery of said holding means, said strain gauge resistors and said compensating resistors being arranged on the same side of said diaphragm, said same side facing said rigid plate, and said resistors being thick film resistors.

5. The pressure sensing apparatus according to claim 4 wherein said holding means is a ring comprising glass frit, and said edge portion of said diaphragm projecting beyond said ring is annular.

6. The pressure sensing apparatus according to claim 4 wherein said Wheatstone bridge is provided with both temperature balancing resistors and zero signal compensating resistors, said temperature balancing resistors and said zero compensating resistors being arranged at diametrically opposite edge areas.

* * * * *